(12) United States Patent
Otake

(10) Patent No.: US 6,305,760 B1
(45) Date of Patent: Oct. 23, 2001

(54) BEHAVIOR CONTROL DEVICE OF VEHICLE CHECKING OCCASIONALLY NORMAL OPERATION OF LONGITUDINAL ACC. SENSOR

(75) Inventor: Hirotada Otake, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/461,194

(22) Filed: Dec. 15, 1999

(30) Foreign Application Priority Data

Dec. 21, 1998 (JP) .................................................. 10-362387

(51) Int. Cl.$^7$ ........................................................ B60T 8/88
(52) U.S. Cl. .................. 303/122.05; 303/147; 303/112; 303/183; 303/182; 303/181; 303/171
(58) Field of Search .................... 303/122.04, 122.05, 303/171, 181, 182, 183, 177, 112, 24.1, 139, 146, 147

(56) References Cited

U.S. PATENT DOCUMENTS

| | | |
|---|---|---|
| 5,200,896 | 4/1993 | Sato et al. . |
| 5,219,212 * | 6/1993 | Shimada et al. ..................... 303/146 |
| 5,423,601 | 6/1995 | Sigl . |
| 5,566,094 | 10/1996 | Kojima et al. . |
| 5,599,075 * | 2/1997 | Hara et al. ........................... 303/143 |
| 5,671,981 * | 9/1997 | Sasaki et al. ..................... 303/122.06 |
| 5,671,982 * | 9/1997 | Wanke ................................. 303/146 |
| 5,701,248 * | 12/1997 | Wanke ................................. 303/146 |
| 5,732,377 * | 3/1998 | Eckert ................................. 303/140 |
| 5,732,379 * | 3/1998 | Eckert et al. ........................ 303/140 |
| 5,735,584 * | 4/1998 | Eckert ................................. 303/148 |
| 5,762,157 * | 6/1998 | Uehara ................................ 303/148 |
| 5,774,821 * | 6/1998 | Eckert ................................. 303/140 |
| 5,813,732 | 9/1998 | Monzaki et al. . |
| 5,862,503 * | 1/1999 | Eckert et al. ........................ 303/140 |
| 6,089,677 * | 7/2000 | Fukumura et al. .................. 303/112 |

FOREIGN PATENT DOCUMENTS

| | | |
|---|---|---|
| 0 655 376 A1 | 5/1995 | (EP) . |
| 7-196029 | 8/1995 | (JP) . |
| 08-136572 | 5/1996 | (JP) . |
| 8-276841 | 10/1996 | (JP) . |

* cited by examiner

Primary Examiner—Robert J. Oberleitner
Assistant Examiner—Devon Kramer
(74) Attorney, Agent, or Firm—Oliff & Berridge, PLC.

(57) ABSTRACT

A behavior control device of a vehicle including a longitudinal acceleration sensor has a judgment system for judging if the longitudinal acceleration sensor is operating normally by comparing an output of the acceleration sensor with a corresponding longitudinal acceleration of the vehicle detected based upon a wheel rotation speed detected by a sensor therefor, excepting at least when the acceleration sensor output is much different from a longitudinal acceleration calculated based upon a wheel drive torque, so that the reliability of the behavior control incorporating the acceleration sensor is ensured, while when the acceleration sensor is not operating normally, the behavior control is modified or suspended.

6 Claims, 11 Drawing Sheets

BEHAVIOR CONTROL DEVICE OF VEHICLE CHECKING OCCASIONALLY NORMAL OPERATION OF LONGITUDINAL ACC. SENSOR

BACKGROUND OF THE INVENTION

1. Field of the Invention

The present invention related to a behavior control of a vehicles such as an automobile, and more particularly, to an improvement of such a behavior control device with regard to the reliability of its normal operation periled by a failure of a longitudinal acceleration sensor incorporated therein.

2. Description of the Prior Art

A wide variety of behavior control devices have been developed in the field of the modern so-called vehicle stability control, the art of controlling a running behavior of a vehicle such as an automobile against such instabilities as a spin, a drift out and others, the control being based upon dynamic control calculations made instantly by an electronic computer incorporating various operation parameters of the vehicle, such as longitudinal and lateral accelerations, vehicle speed, yaw rate, steeling angle, engine operation parameters, etc.

Those various prior art behavior control devices have their particular advantageous operational features. However, it will go without saying that those advantageous operational features will be actually exhibited only when the sensors for detecting various operation parameters of the vehicle needed for the control calculations are operating normally.

In various sensors for detecting the operation parameters of the vehicle, an acceleration sensor for detecting the longitudinal or lateral acceleration of the vehicle body is one of the most important for ensuring a high quality of the vehicle stability control. Nevertheless, the acceleration sensor is constructionally very delicate, and is relatively liable to a malfunction. At present, most of the acceleration sensors for the automobile applications have such a fundamental construction that an inertial mass element movable along a linear guide is biased by a pair of springs from linearly opposite sides thereof so as to be positioned at its neutral position in the absence of any acceleration.

The acceleration sensors of such a fundamental construction will operate unchangeably over a long period, if they are subjected to accelerations acting only along the linear directions. However, in the automobile applications, the acceleration sensors are always subjected to accelerations acting in various directions, regardless whether they are used as a longitudinal acceleration sensor or a lateral acceleration sensor, such that the inertial mass element is often rubbed against the linear guide while it is shifted therealong. Therefore, the acceleration sensors often unavoidably cause a gradual or an abrupt error in their outputs due to a sticking of the inertial mass element to the linear guide. How often and how strong the inertial mass element is rubbed against the linear guide depends on the driver of the vehicle and his/her principal driving area. Therefore, it is very difficult to estimate how long the normal operation of the acceleration sensor is guaranteed.

In Japanese Patent Laid-open Publication 7-196029 (1995), there is proposed a device for judging a failure of a longitudinal acceleration sensor of a vehicle, comprising means for calculating rotation speed of a wheel based upon an output of a wheel speed sensor, means for calculating an estimated vehicle body acceleration based upon the wheel rotation speed, a longitudinal acceleration sensor for detecting longitudinal acceleration of the vehicle, means for calculating a ratio of the vehicle longitudinal acceleration detected by the longitudinal acceleration sensor to the estimated vehicle body acceleration together with an integration calculation of a first integrated value which is decreased when the ratio is within a predetermined range while it is increased when the ratio is outside of the predetermined range, and means for conducting a predetermined failsafe processing when the first integrated value is larger than a predetermined value.

However, the difficulty in judging the normal operation of the acceleration sensors of the vehicles resides in that the vehicles do not always run on a horizontal road, occasionally climbing an uphill road or descending a downslope road, these inclinations all affecting the ostensible outputs of the acceleration sensors having the above-mentioned fundamental construction.

SUMMARY OF THE INVENTION

In view of the above-mentioned difficulty in judging the normal operation of the acceleration sensors of the vehicles, it is a primary object of the present invention to provide a behavior control device of a vehicle such as an automobile, in which the normal operation of the acceleration sensor is often timely judged with the least influence of up and down sloping of the road.

According to the present invention, the above-mentioned primary object of the present invention is accomplished by a behavior control device of a vehicle having a vehicle body, wheels supporting the vehicle body, an engine for driving the vehicle through at least a pair of drive wheels forming a part of the body support wheels, and a brake system for selectively braking at least a part of the body support wheels, the device comprising:

means for detecting operation parameters of the vehicle, the vehicle operation parameter detection means including an acceleration sensor for detecting longitudinal acceleration of the vehicle depending upon an inertia of a movable mass element, means for detecting rotation speed of at least one of the body support wheels, means for detecting a torque for driving the drive wheels, means for detecting longitudinal acceleration of the vehicle depending upon the wheel rotation speed detected by the wheel rotation speed detection means, and means for detecting longitudinal acceleration of the vehicle dependent upon the wheel drive torque detected by the wheel drive torque detection means, means for judging the acceleration sensor as not operating normally according to the longitudinal acceleration detected by the acceleration sensor being different from the longitudinal acceleration detected by the wheel rotation dependent longitudinal acceleration detection means beyond a threshold value predetermined therefor, excepting at least when the longitudinal acceleration detected by the acceleration sensor is not different from the longitudinal acceleration detected by the wheel drive torque dependent longitudinal acceleration detection means beyond a threshold value predetermined therefor, and means for controlling the brake system based upon the operation parameter or parameters of the vehicle detected by at least one, including the acceleration sensor, of the vehicle operation parameter detection means, so as to control a running behavior of the vehicle, with a modification thereof for a compensation for a failure of a normal operation of the acceleration sensor when it is not judged as normally operating by the acceleration sensor normal operation judgment means.

The above-mentioned modification of the running behavior control may include a suspension of the control.

When a vehicle is climbing an uphill road of an angle α of inclination, the longitudinal acceleration detected by the acceleration sensor of the above-mentioned common construction will be larger than the linear acceleration of the vehicle along the road surface as much as a difference g·sin α, wherein g is the acceleration of gravity, while the wheel drive torque required for accelerating the vehicle along the uphill road of the inclination angle α is larger than the drive torque required for accelerating the vehicle to the same acceleration along a horizontal road as much as an amount corresponding to an acceleration g·sin α of the vehicle. Therefore, if the longitudinal acceleration detected by the acceleration sensor is compared with the longitudinal acceleration detected by the wheel drive torque dependent longitudinal acceleration detection means, the two longitudinal acceleration values should be the same even when the vehicle is accelerated on an uphill road, provided that the acceleration sensor is operating normally, although the threshold value for such a judgment will have to be a little lager (and therefore less precise) for comparing the output of the acceleration sensor with the output of the wheel drive torque dependent longitudinal acceleration detection means than for comparing the output of the acceleration sensor with the output of the wheel rotation dependent longitudinal acceleration detection means.

Therefore, even when the longitudinal acceleration detected by the acceleration sensor is different from the longitudinal acceleration detected by the wheel rotation dependent longitudinal acceleration detection means beyond the threshold value predetermined therefor, if it is judged that the longitudinal acceleration detected by the acceleration sensor is not different from the longitudinal acceleration detected by the wheel drive torque dependent longitudinal acceleration detection means beyond the threshold value predetermined therefor, at least a judgment error due to the vehicle climbing an uphill road is avoided.

The acceleration sensor may comprise first and second linear acceleration sensor elements mounted to the vehicle body along a phantom plane disposed substantially horizontally relative to the vehicle, the first linear acceleration sensor element being substantially turned from both longitudinal and lateral directions of the vehicle, while the second linear acceleration sensor element is turned from the first linear acceleration sensor element for an angle not substantially different from a light angle, so that a longitudinal acceleration of the vehicle body is detected by comparing linear accelerations detected along the first and second linear acceleration sensor elements, while a lateral acceleration of the vehicle body is also available by comparing the linear accelerations detected along the fast and second linear acceleration sensor elements.

By such an arrangement of the longitudinal and lateral acceleration sensors, the normal operation of the lateral acceleration sensor is also checked together with checking the longitudinal acceleration sensor.

The behavior control device according to the basic construction of the present invention may further comprise means for calculating a spin quantity indicating a liability of the vehicle to spin and a driftout quantity indicating a liability of the vehicle to driftout based upon parameters available from the vehicle operation parameter detection means, and means for detecting a maximum wheel drive torque accelerating the vehicle in the period of the acceleration, means for detecting a difference between a longitudinal acceleration of the vehicle corresponding to the maximum wheel drive torque and a longitudinal acceleration detected by the acceleration sensor at a moment of the maximum wheel drive torque being generated, and means for calculating a load of the vehicle based upon a ratio of the longitudinal acceleration difference to the maximum wheel drive torque, wherein the brake system control means modify at least one of the spin quantity and the driftout quantity for a compensation for the load in controlling a braking force applied to each selected one of the wheels based upon at least one of the spin quantity and the driftout quantity.

Since, according to the basic construction of the behavior control device of the present invention, the normal operation of the longitudinal acceleration sensor is ensured, changes of the load on the vehicle will be calculated from corresponding changes of the above-mentioned ratio of the longitudinal acceleration difference to the maximum wheel drive torque. When the load on the vehicle increases, the inertia of the vehicle correspondingly increases. In a spin or a driftout control, it is desirable that, when the inertia of the vehicle increases, an execution of the spin or driftout control is started earlier. Therefore, by modifying the spin quantity or the driftout quantity for a compensation for the load in controlling a braking force applied to each selected one of the wheels based upon the spin quantity or the driftout quantity, the quality of the anti-spin or anti-driftout behavior control is correspondingly improved with respect changes of the load on the vehicle.

The behavior control device according to the basic construction of the present invention may further comprise means for detecting a maximum wheel drive torque accelerating the vehicle in the period of the acceleration, means for detecting a difference between a longitudinal acceleration of the vehicle detected by the wheel rotation dependent acceleration detection means and a longitudinal acceleration detected by the acceleration sensor at a moment of the maximum wheel drive torque being generated, and means for calculating a tire diameter of the wheels based upon a ratio of the longitudinal acceleration difference to the maximum wheel drive torque, wherein the brake system control means calculate a slip ratio to be effected at each selected one of the wheels by a controlled braking applied thereto with a compensation for the tire diameter.

It is probable that the tires of the vehicles are changed by customers according to their taste with tires of a different diameter. In this case, the behavior control device preset for each type of vehicle will not properly operate. Since, again according to the basic construction of the behavior control device of the present invention, the normal operation of the longitudinal acceleration sensor is ensured, changes of the tire diameter will be calculated from corresponding changes of the above-mentioned ratio of the longitudinal acceleration difference to the maximum wheel drive torque. Therefore, by the brake system control means calculating a slip ratio to be effected at each selected one of the wheels by a controlled braking applied thereto with a compensation for the tire diameter thus calculated, the behavior control device preset for a predetermined tire diameter will always operate as expected, regardless of optional changes of the tire diameter by customers.

The behavior control device according to the basic construction of the present invention may further comprise means for detecting the vehicle descending a downslope road according to if a longitudinal acceleration of the vehicle detected by the wheel rotation dependent acceleration detection means is smaller than a longitudinal acceleration detected by the acceleration sensor by a difference larger than a threshold longitudinal acceleration difference value predetermined therefor with no positive wheel drive torque dependent acceleration of the vehicle, and means for calculating a downslope angle based upon the longitudinal acceleration difference, wherein the brake system control means modify a behavior control braking applied to each selected one of the wheels according to the downslope angle for a compensation for a reduction of a ground contact force of each of the wheels with the vehicle being on a downslope road.

When a vehicle is running on a sloped road, the contact force of the wheels against the road surface becomes smaller relative to the inertial mass value of the vehicle than when the vehicle is running on a horizontal road, thereby correspondingly decreasing the longitudinal and lateral behavior control forces available by a selective braking applied to a selected wheel or wheel for the purpose of a behavior control. On the other hand, the ostensible output of the longitudinal acceleration sensor of the above-mentioned common construction changes from the actual longitudinal acceleration of the vehicle body due to an influence of the gravity acting to the inertial mass element of the longitudinal acceleration sensor.

However, since, according to the basic construction of the behavior control device of the present invention, the normal operation of the longitudinal acceleration sensor is ensured, when the vehicle is descending a downslope road, it is detected by the longitudinal acceleration of the vehicle detected based upon the wheel rotation dependent acceleration detection means is smaller than the longitudinal acceleration detected by the longitudinal acceleration sensor by a difference larger than a threshold value predetermined therefor with the wheel drive torque dependent detection means detecting no positive wheel chive torque, and further, the downslope angle will be calculated based upon the difference of longitudinal acceleration. Therefore, by the brake system control means modifying a behavior control braking applied to each selected one of the wheels according to the downslope angle for a compensation for the reduction of the ground contact force of each of the wheels when the vehicle is descending a downslope road, the quality of the behavior control will be further improved to be adaptable to a downslope running according to the angle of its inclination.

When the longitudinal acceleration detection means are constructed by such first and second linear acceleration detection means arranged as described above, the behavior control device according the basic construction of the present invention may further be constructed such that the vehicle operation parameter detection means further include means for detecting yaw rate of the vehicle body, and means for detecting vehicle speed, the device further comprising means for calculating a cant angle of a road surface based upon a difference between a lateral acceleration of the vehicle body detected by the combination of the first and second linear acceleration sensor elements and a lateral acceleration calculated as a product of a yaw rate and a vehicle speed detected by the yaw rate detection means and the vehicle speed detection means, respectively, wherein the brake system control means modify a behavior control braking applied to each selected one of the wheels according to the cant angle for a compensation for an influence of a cant of a road surface on a behavior of the vehicle.

By a cant of the road surface being incorporated into the behavior control based upon the confirmation that the longitudinal acceleration sensor as well as the lateral acceleration sensor are normally operating, the quality of the behavior control will be further improved with respect to anti-spin and ant-driftout controls which are substantially affected by a canting condition of the road surface.

BRIEF DESCRIPTION OF THE DRAWINGS

In the accompanying drawings.

DESCRIPTION OF THE EMBODIMENTS

In the following, the present invention will be described in more detail in the form of a synthetic embodiment thereof incorporating various aspects of the invention in one embodiment, with reference to the accompanying drawings.

Figure 1A:
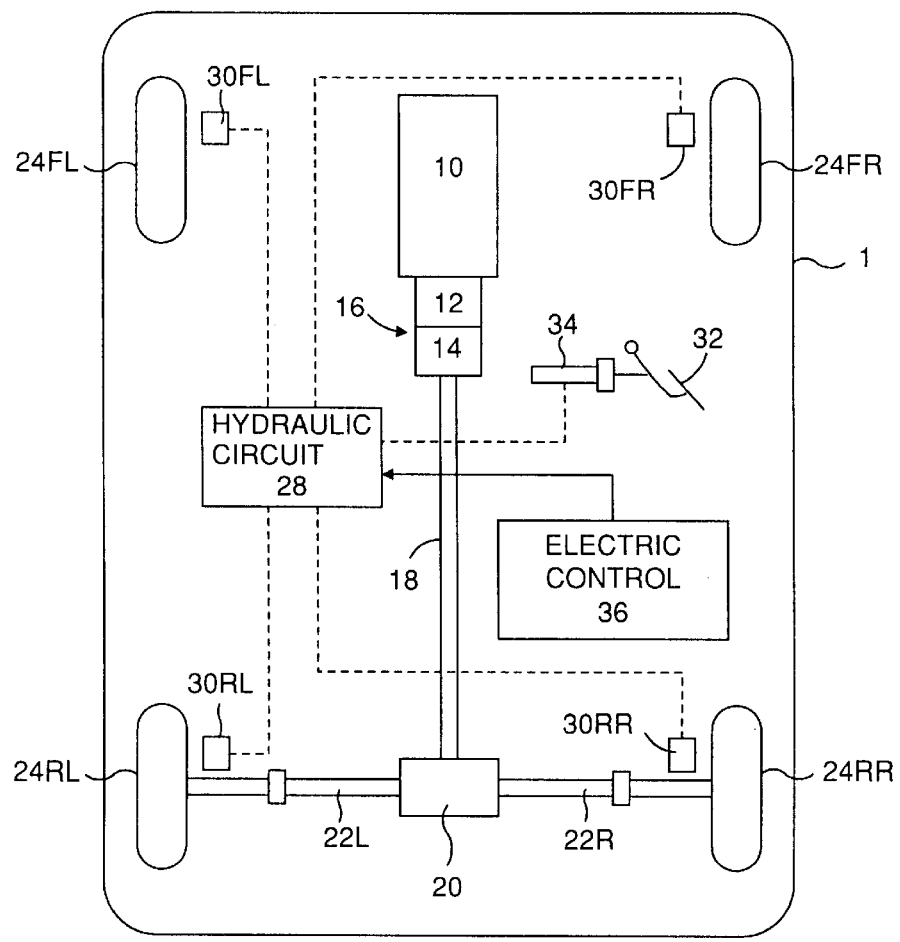
FIG. 1A is a diagrammatical plan view of a four-wheeled vehicle, or an ordinary automobile, in which the behavior control device of the present invention is incorporated.

Referring to FIG. 1A, a four-wheeled vehicle, or an ordinary automobile, has a vehicle body 1 diagrammatically shown by a scare and front left, front right, rear left and rear right wheels designated by 24FL, 24FR, 24RL and 24RR, respectively, supporting the vehicle body 1 by suspension means not shown in the figure. The front left and front right wheels 24FL and 24FR are non-driven wheels, whereas the rear left and rear right wheels 24RL and 24RR are drive wheels adapted to be driven by an engine 10 through an automatic transmission 16 including a torque converter 12 and a speed change gear 14, a propeller shaft 18, a differential gear 20 and rear left and rear right axles 22L and 22R, respectively. The front left, front right, rear left and rear light wheels 24FL, 24FR, 24RL and 24RR are each adapted to be applied with braking forces by corresponding wheel cylinders 30FL, 30FR, 30RL and 30RR adapted to be supplied with a hydraulic pressure from a hydraulic circuit 28 according to a depression of a brake pedal 32 by a driver for actuating a master cylinder 34, or according to a behavior control made by an electric control 36 constructed substantially by a microcomputer.

As is already well known in the art, when the vehicle is going to spin in a counter-clockwise direction as viewed in FIG. 1A, the front light wheel 24FR is braked according to an actuation of the hydraulic circuit 28 under a spin suppress control calculation conducted by the electric control 36, so as to generate an anti-spin moment in the vehicle around the braked front right wheel 24FR, or when the vehicle is going to driftout when the vehicle is making a left turn as viewed in FIG. 1A, the rear left wheel 24RL or both the rear left wheel 24RL and the rear right wheel 24RR are braked by an actuation of the hydraulic circuit 28 according to a driftout suppress control conducted by the electric control 36, so that the vehicle is decelerated, thereby decreasing a centrifugal force acting at the vehicle in the direction of drifting out the vehicle, with a simultaneous effect of driftout suppress control that according to the braking of the rear wheels the side grip of the rear wheels is reduced due to a longitudinal slipping of the wheels against the road surface, whereby the rear portion of the vehicle is shifted outside of the turn, so as to turn the vehicle toward the inside of the turn. Further, when the rear left wheel 24RL only is braked, or the rear left wheel 24RL is more braked than the rear right wheel 24RR, a counter-clockwise yaw moment is generated around the rear left wheel as viewed in FIG. 1A, so as to suppress the drifting out of the vehicle.

Figure 1B:
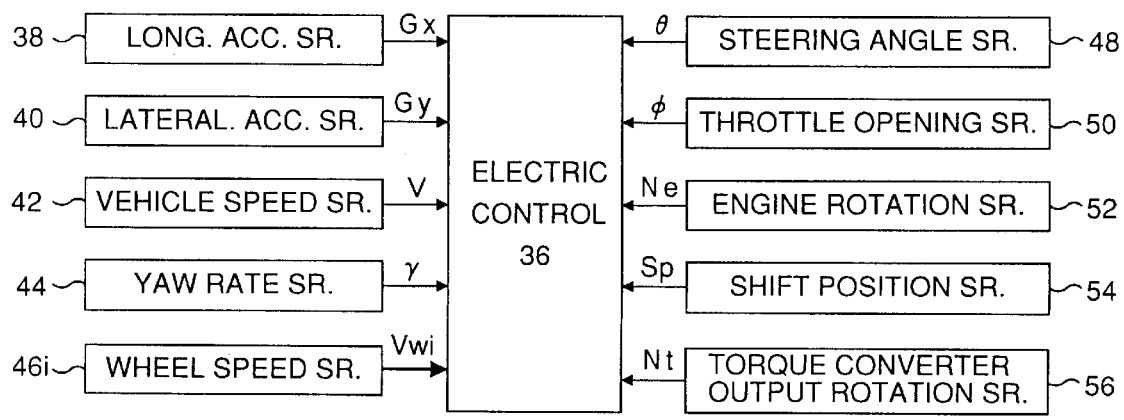
FIG. 1B is a diagrammatical plan view of the electric control shown in FIG. 1A and various sensors supplying various vehicle operation parameters to the electric control.

The electric control 36 is supplied with various operation parameters of the vehicle from corresponding parameter sensors as diagrammatically shown in FIG. 1B. As shown in the figure, the electric control 36 is supplied with longitudinal acceleration Gx of the vehicle body from a longitudinal acceleration sensor 38, lateral acceleration Gy of the vehicle body from a lateral acceleration sensor 40, vehicle speed V from a vehicle speed sensor 42, yaw rate γ from a yaw rate sensor 44, wheel speeds Vwi (i=fl, fr, rl and rr) from corresponding wheel speed sensors 46i (i=fl, fr, rl and rr), steeling angle θ of a steering system of the vehicle not shown in the figure from a steering angle sensor 48, throttle opening φ of the engine 10 from a throttle; opening sensor 50, engine rotation speed Ne from an engine rotation sensor 523 shift position Sp of the speed change gear 14 from a shift position sensor 54, and output rotation speed Nt of the torque converter 12 from a torque converter output rotation sensor 56.

The electric control 36 conducts behavior control calculations for various behavior controls such as a spin suppress control or a driftout suppress control according to a program incorporated therein based upon the engine operation parameters as shown in FIG. 1B, so as to selectively apply a controlled braking force to a selected one or more of the four wheels to accomplish the behavior control. Such a behavior control of the vehicle is now already known in the wide variety. Since it is not the purpose of the present invention to propose a further variety to those prior art behavior controls, it is assumed that the behavior control device of the present invention may use any appropriate one of those prior art behavior controls, provided that the use is allowed on a condition or no condition. As will be apparent from the above-mentioned summary of the present invention, the essence of the present invention is to incorporate a reliable checking of the normal operation of acceleration sensors.

Figure 2:
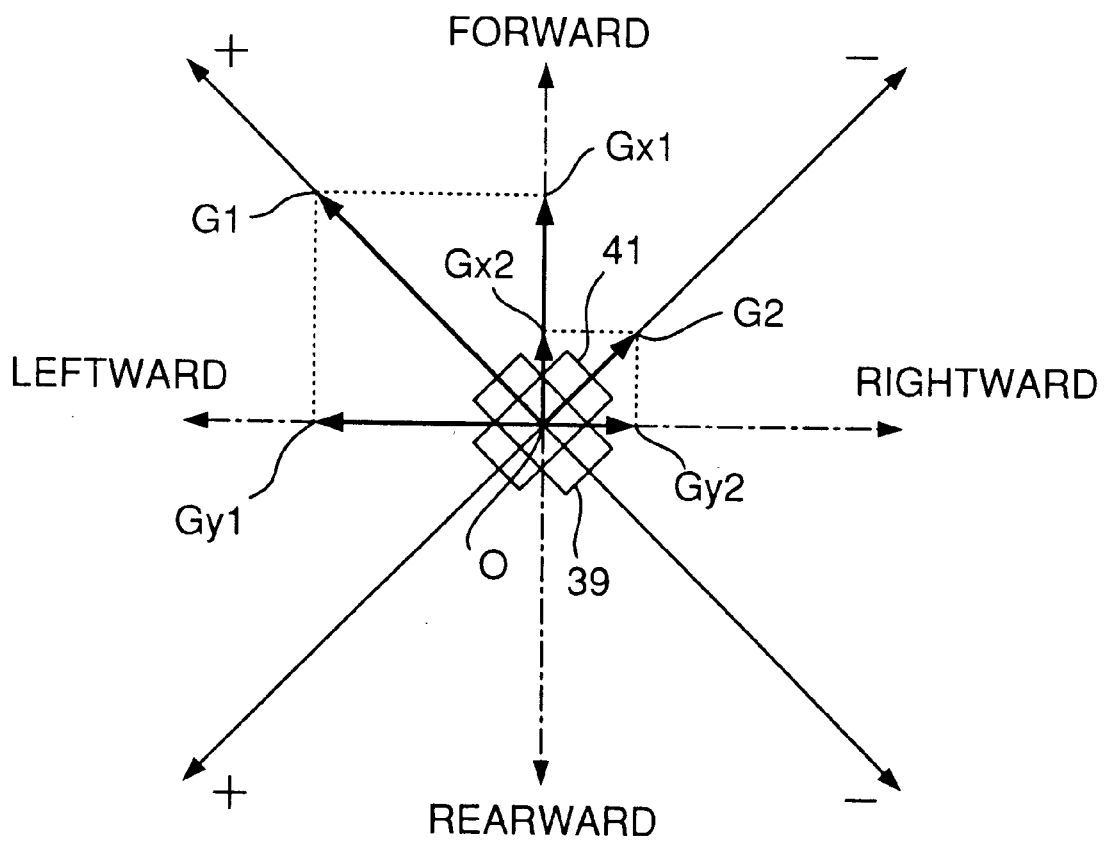
FIG. 2 is a diagrammatical illustration of an embodiment of a combination of two linear acceleration sensors providing an assembly of a longitudinal acceleration sensor and a lateral acceleration sensor for use with a behavior control device of a vehicle.

FIG. 2 is a diagrammatical view showing an assembly of two linear acceleration sensors adapted to detect longitudinal accelerations acting along forward-rearward directions of the vehicle as well as lateral accelerations acting along leftward-rearward directions of the vehicle. First and second linear acceleration sensors 39 and 41 are mounted to the vehicle body not shown in FIG. 2 along a phantom plane disposed substantially horizontally relative to the vehicle body, with the first linear acceleration sensor 39 being equally turned from both the longitudinal and lateral directions of the vehicle, thereby making 45° against the respective directions, while the second linear acceleration sensor 49 are turned from the first linear acceleration sensor 39 for a light angle, so that the second linear acceleration sensor 41 is also equally turned from both the longitudinal and lateral directions of the vehicle.

The first and second linear sensors 39 and 41 have each the above-mentioned conventional basic construction that an inertial mass element (not shown) is movable along a linear guide (not shown) extending therealong and biased from linearly opposite sides by a pair of springs (not shown) so as to be positioned at a neutral point O in the absence of any acceleration acting thereon. For the sake of convenience, with respect to the first linear acceleration sensor 39, a shifting of the inertial mass element in the upper left direction in FIG. 2 from the neutral point O is assumed to indicate a positive acceleration, while a shifting of the inertial mass element in the lower right direction in FIG. 2 from the neutral point O is deemed to indicate a negative acceleration. Similarly, with respect to the linear acceleration sensor 41, a shifting of the inertial mass element in the lower left direction as viewed in FIG. 2 is deemed to indicate a positive acceleration, while a shifting of the inertial mass moment in the upper light direction as viewed in FIG. 2 from the neutral point O is deemed to indicate a negative acceleration.

Therefore, based upon the above-mentioned assumptions, in an example shown in FIG. 2 where the first linear acceleration sensor 39 outputs acceleration G1 in its positive direction, while the second linear acceleration sensor 41 outputs acceleration G2 in its negative direction, the longitudinal acceleration with respect to the vehicle assumed to be positive when it is directed forward of the vehicle is obtained as Gx1−Gx2, wherein Gx1 is a forward component of the acceleration G1, while Gx2 is a forward component of the acceleration G2. In the shown embodiment wherein the linear axis of the first and second acceleration sensors 39 and 42 are both turned 45° from the longitudinal and lateral directions of the vehicle body, Gx1 and Gx2 are equal to G1/√2 and G2√2, respectively. Therefore, the longitudinal acceleration Gx is obtained as (G1−G2)/√2. In the example shown in FIG. 2, since the value of G2 is negative, the vector of the longitudinal acceleration Gx corresponds to a linear addition of vector Gx1 and vector Gx2.

On the other hand, the lateral acceleration acting in the shown example is calculated as Gy1+Gy2, wherein Gy1 and Gy2 are the lateral components of G1 and G2, respectively, acting along leftward-rightward direction. Similarly, Gy1 and Gy2 are equal to G1√2 and G2√2, respectively. The lateral acceleration Gy is obtained as (G1+G2)/√2. Since in the shown example Gy2 is negative, the vector of Gy corresponds to a vector obtained by shortening the vector Gy1 by the length of vector Gy2.

It will be appreciated by one of ordinary skill in the art that the directions of the linear acceleration sensors 39 and 41 are not necessarily be in the direction of exactly halving the right angle expanded between the longitudinal and lateral directions of the vehicle body. As a matter of principle, it is possible to obtain both the longitudinal and lateral accelerations by using two linear acceleration sensors arranged in any mutually different directions- However, as a matter of industrial technique, particularly in view of the above-mentioned fundamental construction of the linear acceleration sensors, it is desirable that each of the two linear acceleration sensors are inclined as a larger angle relative to both the longitudinal and lateral directions of the vehicle body as possible, while the two linear acceleration sensors are oriented as closer to a right angle relative to one another as possible. Therefore, it will be appreciated that when a longitudinal acceleration sensor and a lateral acceleration sensor are provided by a combination of two linear acceleration sensors, the embodiment shown in FIG. 2 will be the most desirable for the actual applications. Of course, it is physically impossible to arrange two linear accelerations sensors such as 39 and 41 aligned in a common phantom plane with each neutral point O coincided with one another. Therefore, in actual devices, the first and second linear acceleration sensors 39 and 41 may be laid one over the other so that their neutral points O align with one another as viewed from the top of the device as shown in FIG. 2, or they may be arranged in a common phantom plane as close to one another as possible with their neutral points O being separated from one another when viewed in a plan view such as FIG. 2.

Now, the essential construction of the behavior control device according to the present invention will be described with respect to a synthetic embodiment incorporating various aspects of the invention in one embodiment. It is to be noted that some of the features incorporated in this synthetic embodiment may be optionally omitted in carrying out the present invention. In the following, the constructions of the behavior control device of the present invention will be described in the form of its operation, because the inventive constructions of the invention are indeed the calculations conducted by an electronic computer, as in most of the prior art behavior control devices developed in this art.

Figure 3:
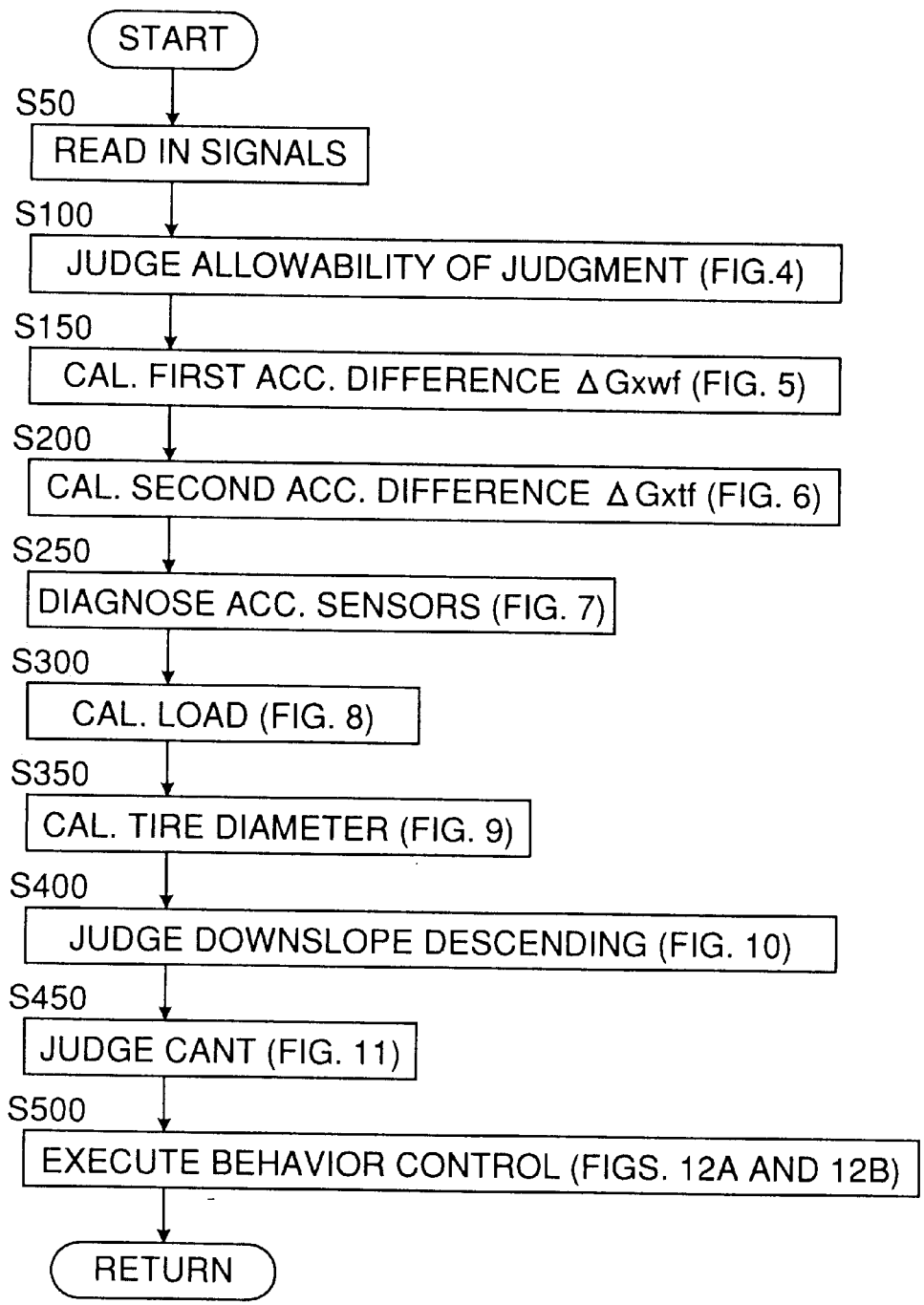
FIG. 3 is a flowchart showing a summary of the overall operations of a synthetic embodiment of the behavior control device according to the present invention.

Referring to FIG. 3, the overall operations of the synthetic embodiment of the behavior control device according the present invention are shown in the form of a flowchart.

When the behavior control device is started by an ignition switch (not shown) of the vehicle in which the present behavior control device is mounted being turned on, in step 50, signals indicating those vehicle operation parameters as shown in FIG. 1B are read in.

Figure 4:
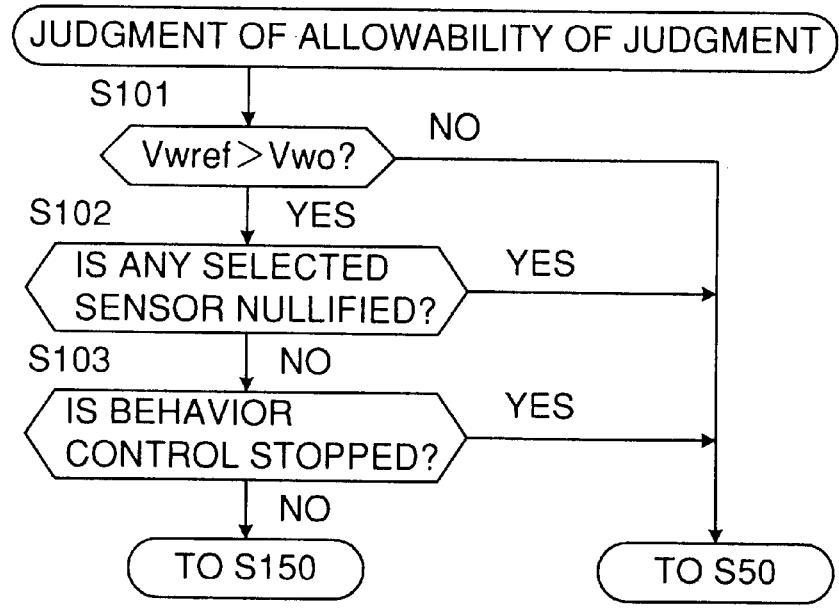
FIG. 4 is a flowchart of a subroutine showing the operations carried out in step 100 of FIG. 3.

In step 100, an allowability of judgment is judged according to a subroutine such as shown in FIG. 4. As will be described in detail hereinbelow, it is judged if the vehicle is running at a speed high enough to conduct various judgments and/or control operations. Further, it is confirmed that any selected sensor is not nullified or the behavior control by the present behavior control device is not stopped, in order to further proceed toward the following steps.

Figure 5:
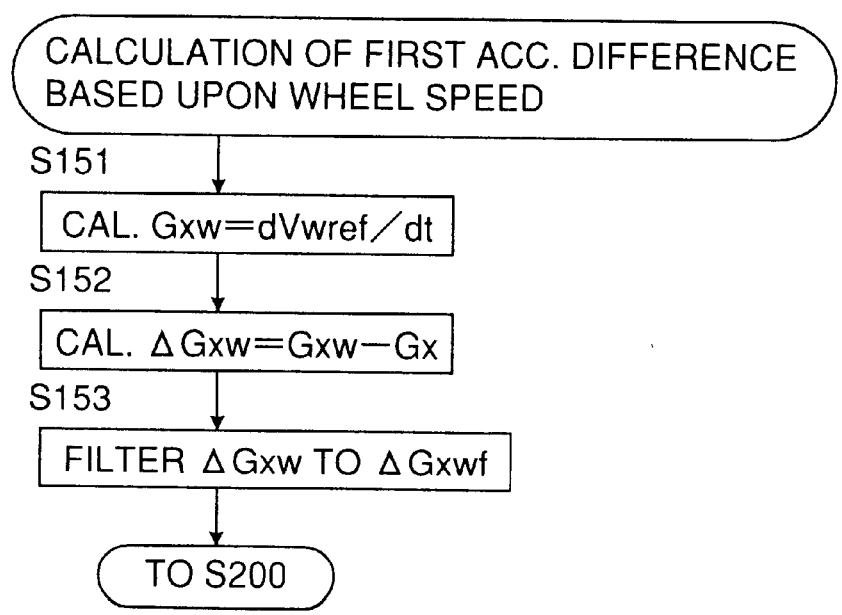
FIG. 5 is a flowchart of a subroutine showing the operations carried out in step 150 FIG. 3.

In step 150, a first acceleration difference ΔGxwf is calculated according to a sub routine such as shown in FIG. 5. The first acceleration difference is a difference between a longitudinal acceleration calculated based upon the wheel speed sensors 46i and the longitudinal acceleration detected by the longitudinal acceleration sensor 38 or the combination of near acceleration sensors 39 and 41.

Figure 6:
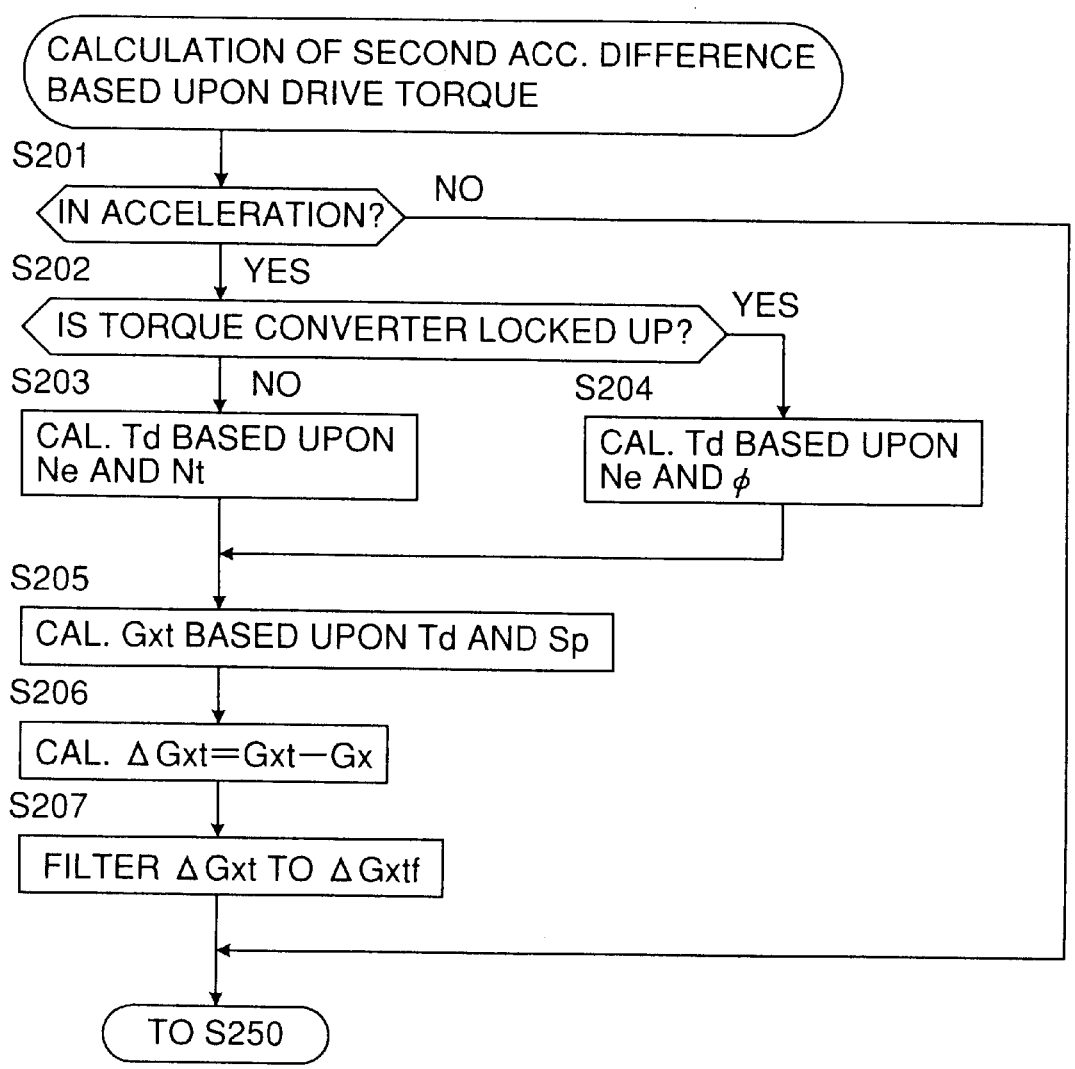
FIG. 6 is a flowchart of a subroutine showing the operations carried out in step 200 of FIG. 3.

In step 200, a second acceleration difference ΔGxtf is calculated according to a subroutine such as shown in FIG. 6. The second acceleration difference is a difference between a longitudinal acceleration calculated based upon the wheel drive torque and a longitudinal acceleration detected by the longitudinal acceleration sensor 38 or the combination of linear acceleration sensors 39 and 41.

Figure 7:
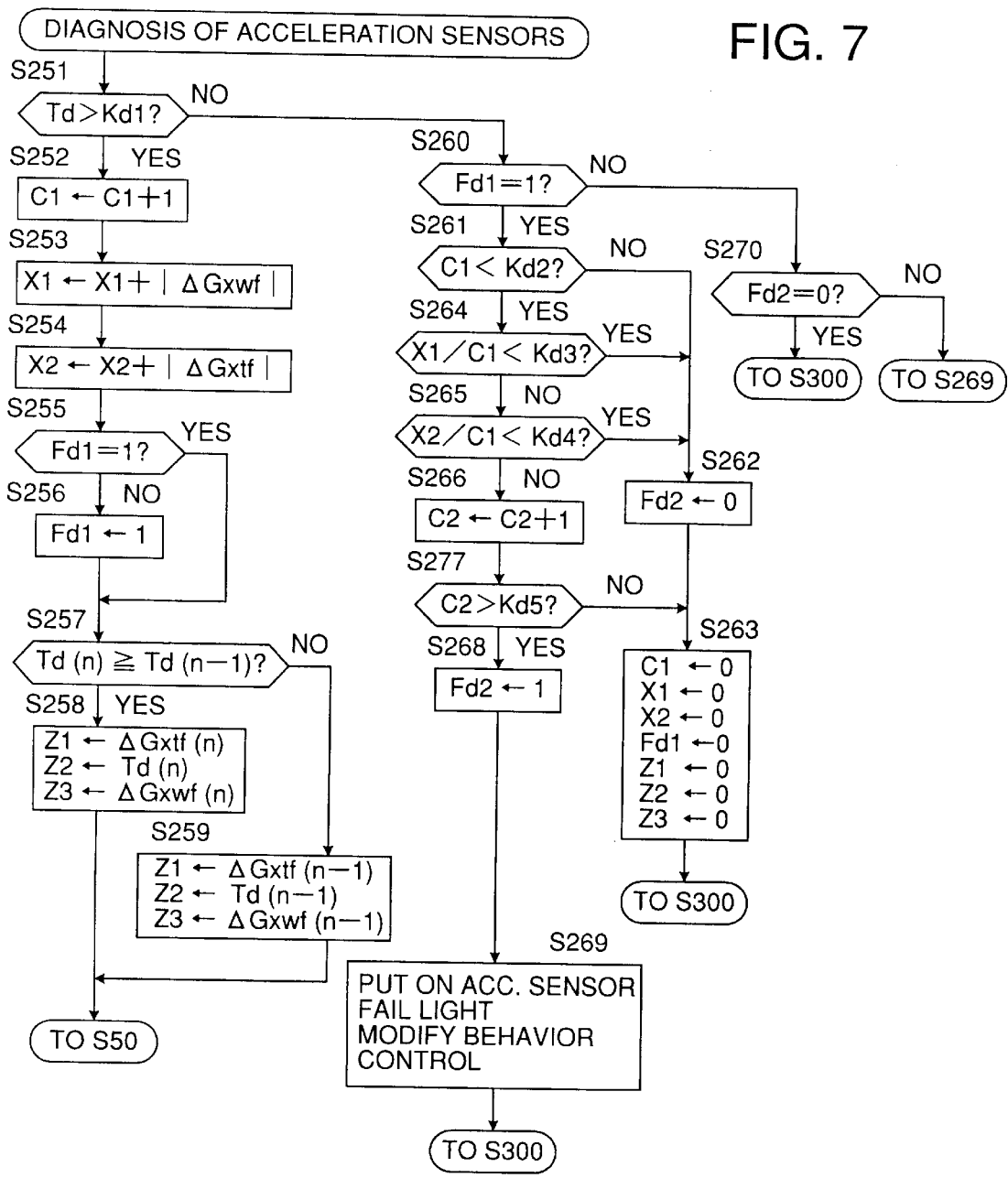
FIG. 7 is a flowchart of a subroutine showing the operations carried out in step 250 of FIG. 3.

In step 250, according to a subroutine such as shown in FIG. 7, the acceleration sensor 38 or the combination of the sensors 39 and 41 is diagnosed. This step checks if the longitudinal acceleration sensor is operating normally by judging at least if the difference between the longitudinal acceleration detected by the longitudinal acceleration sensor and the longitudinal acceleration detected by the wheel drive torque dependent longitudinal acceleration detection means is not larger than a threshold value predetermined therefor when the vehicle is accelerated to an acceleration higher than a threshold value predetermined therefor or if the difference between the longitudinal acceleration detected by the longitudinal acceleration sensor and the longitudinal acceleration detected by the wheel rotation dependent longitudinal acceleration detection means is not larger than a threshold value predetermined therefor by timely picking up each short period during a running of the vehicle in which the vehicle may be assumed as temporarily accelerated on a horizontal road.

As will be described in detail hereinbelow with respect to FIG. 7, when it is checked that the longitudinal acceleration sensor 38 is operating normally, or as in the present embodiment the two linear acceleration sensors 39 and 41 are simultaneously checked as operating normally so as to output a correct lateral acceleration, the control proceeds to step 300, whereas when it is checked that the acceleration sensor 38 or at least one of the two linear acceleration sensors 39 and 41 is not normally operating, a lump for warning a malfunction of the acceleration sensor (not shown) is put on, and the vehicle behavior control is modified to compensate for the malfunction of the acceleration sensor, such a modification including a stopping of a certain part or all of the behavior control.

Figure 8:
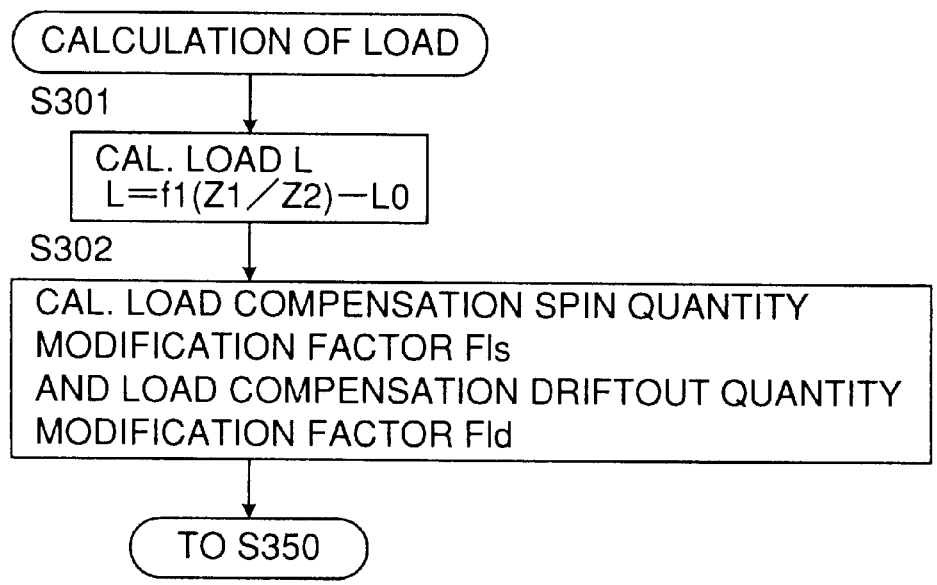
FIG. 8 is a flowchart of a subroutine showing the operations carried out in step 300 of FIG. 3.

In step 300, based upon the confirmation that a correct longitudinal acceleration is available by the normally operating acceleration sensors, a load on the vehicle is calculated according to a subroutine such as shown in FIG. 8, and a modification factor for modifying a spin suppress control or a driftout suppress control is calculated for compensating such a behavior control according to changes of the load on the vehicle.

Figure 9:
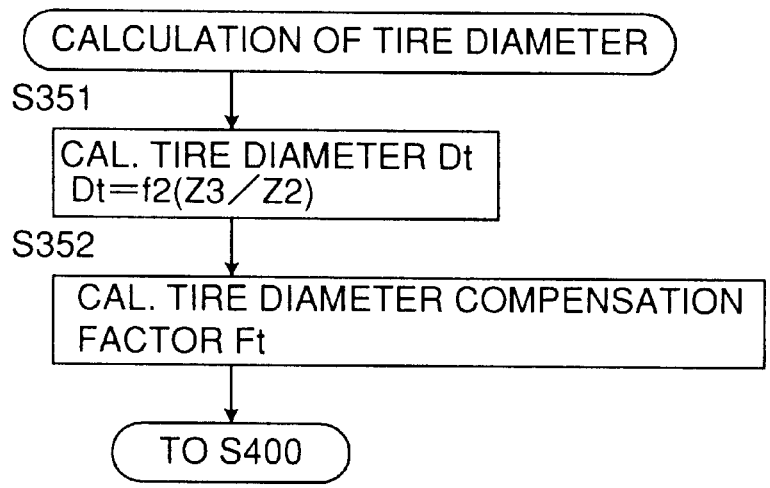
FIG. 9 is a flowchart of a subroutine showing the operations carried out in step 350 of FIG. 3.

In step 350, also based upon the confirmation that a correct longitudinal acceleration is available from the longitudinal acceleration sensor, the tire diameter of the wheels is calculated according to a subroutine such as shown in FIG. 9, and a factor for modifying a behavior control such as a spin suppress control or a driftout suppress control is calculated for compensating an influence of changes of the tire diameter on such a behavior control.

Figure 10:
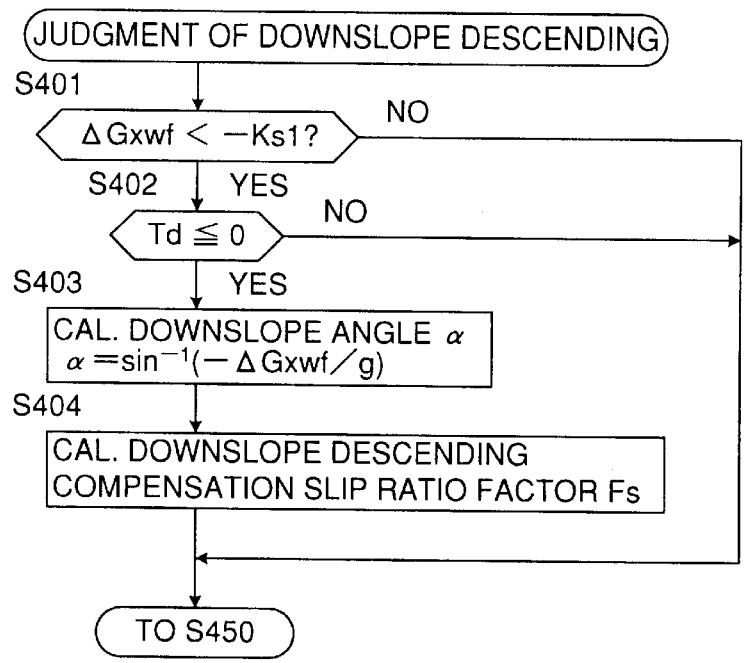
FIG. 10 is a flowchart of a subroutine showing the operations carried out in step 400 of FIG. 3.
Figure 11:
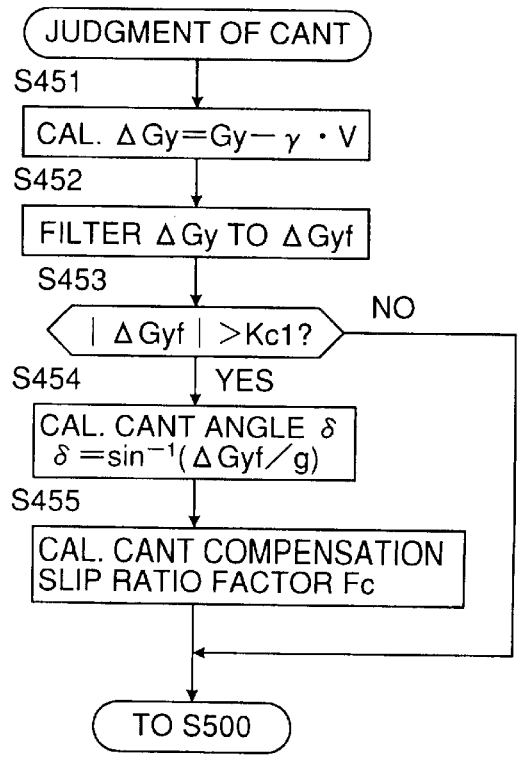
FIG. 11 is a flowchart of a subroutine showing the operations carried in step 450 of FIG. 3.

In step 400, it is judged if the vehicle is descending a downslope road according to a subroutine such as shown in FIG. 10, and a factor for modifying a behavior control such as a spin suppress control or a driftout suppress control is calculated for compensating the reduction of the tire grip force against the road surface due to an inclination of the vehicle relative to a horizontal level. In step 450, based upon the confirmation that a correct lateral acceleration is available from the combination of the two linear sensors 39 and 41, a cant of the road surface is judged according to a subroutine such as shown in FIG. 11, and a factor for modifying a behavior control such as a spin suppress control or a driftout suppress control is calculated for compensating an influence of a canting of the road surface on such a behavior control.

Figure 12A:
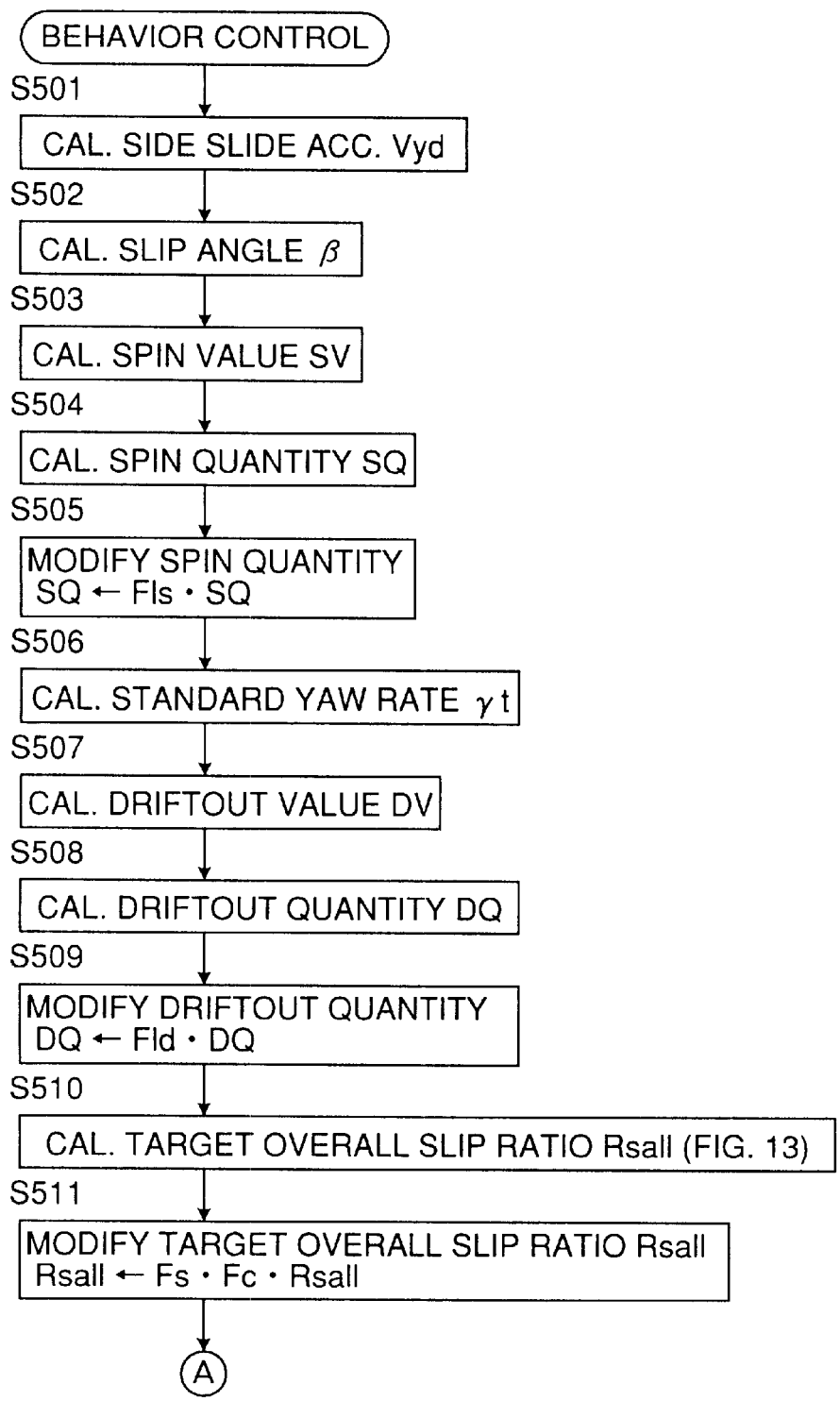
FIGS. 12A and 12B are a flowchart of a subroutine showing the operations carried out in step 500 of FIG. 3.
Figure 12B:
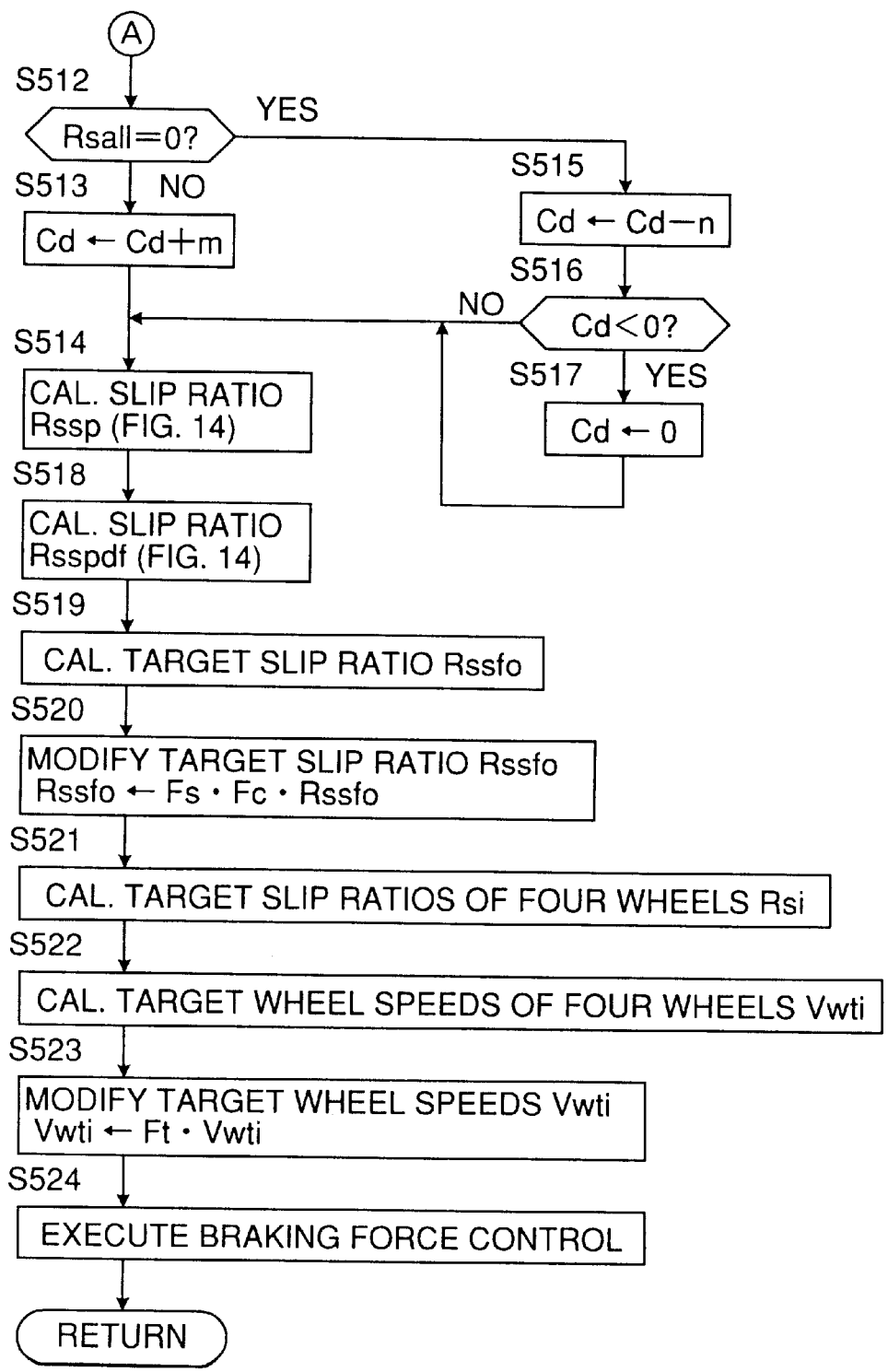

Finally, in step 500, a behavior control is executed according to a subroutine such as shown in FIGS. 12A and 12B. The behavior control according to the flowchart of FIGS. 12A and 12B is an example taken from the known art, as this part does not form a part of the present invention. Indeed, the behavior control according to the steps shown in FIGS. 12A and 12B substantially follows the art described in U.S. Pat. No. 5,813,732 assigned to the same assignee as the present application.

Now, the details of the respective steps in the flowchart of FIG. 3 will be described with reference to FIGS. 4–14.

Referring to FIG. 4 showing the details of the operations carried out in step 100 of FIG. 3 for judgment of allowability of judgment, in step 101 it is judged if a reference wheel speed Vwref is larger than a predetermined threshold wheel speed Vwo. The reference wheel speed Vwref is the wheel rotation speed of a reference wheel detected by the corresponding wheel speed sensor 46i (i=fl, fr, rl or rr). The reference wheel may be determined to be the non-driven front left wheel 24FL or the non-driven front right wheel 24FR when the vehicle is a rear drive vehicle such as the embodiment shown in FIG. 1A. The threshold wheel speed Vwo is determined to be a lowest wheel speed above which the vehicle is deemed to be substantially running. When the answer is yes, the control proceeds to step 102, while when the answer is no, the control returns to step 50.

In step 102, it is judged if any selected sensor such as those shown in FIG. 1B is nullified. When the answer is yes, the control returns to step 50, so that any further steps including the behavior control are not carried out under a malfunction of an essential sensor. When the answer of step 102 is no, the control proceeds to step 103, and it is judged if the behavior control is stopped. The judgment of step 103 becomes yes when the behavior control of step 500 of FIG. 3 is stopped for a certain reason. When the answer of step 103 is yes, the control returns to step 50, while when the answer of step 103 is no, the control proceeds to step 150.

Referring to FIG. 5 showing the details of the operations carried out in step 150 of FIG. 3 for calculation of first acceleration difference based upon wheel speed, in step 151, an acceleration Gxw based upon the reference wheel speed Vwref is calculated by differentiating Vwref by time. Then in step 152, a first acceleration difference ΔGxw is calculated as a difference between Gxw and the longitudinal acceleration Gx detected by the longitudinal acceleration sensor 38 or the combination of the two linear acceleration sensors 39 and 41 shown in FIG. 2. In step 153, the acceleration difference ΔGxw is filtered to ΔGxwf by noises being removed therefrom. Then the control proceeds to step 200.

Referring to FIG. 6 showing the details of the operations carried out in step 200 of FIG. 3 for calculation of second acceleration difference based upon wheel drive torque, in step 201 it is judged if the vehicle is in acceleration. This judgment may be made by the acceleration Gwx calculated in step 151 of FIG. 5 is larger than a predetermined threshold value indicating that the vehicle is in a substantial acceleration suitable for calculating the acceleration of the vehicle based upon the wheel drive torque as described hereinbelow. When the answer is no, the control proceeds to step 250, substantially bypassing this subroutine.

When the answer of step 201 is yes, the control proceeds to step 202, and it is judged if the torque converter 12 is locked up. When the answer is no, the control proceeds to step 203, while when the answer is yes, the control proceeds to step 204.

In step 203, wheel drive torque Td is calculated based upon engine rotation speed Ne detected by the engine rotation sensor 52 and torque converter output rotation speed Nt detected by the torque converter output rotation sensor 56. In step 204, a wheel drive torque Td is calculated based upon engine rotation speed Ne detected by the engine rotation sensor 52 and throttle opening φ detected by the throttle opening sensor 50. In either case, the control proceeds to step 205.

In step 205, a longitudinal acceleration Gxt of the vehicle is calculated based upon the wheel drive torque Td and shift position Sp of the speed change gear 14 detected by the shift position sensor 54.

In step 206, a second acceleration difference ΔGxt is calculated as a difference between Gxt and Gx detected by the longitudinal acceleration sensor 38 or the combination of the linear acceleration sensors 39 and 41. Then in step 207, the acceleration difference ΔGxt is filtered to ΔGxtf by noises being deleted therefrom. Then the control proceeds to step 250.

Referring to FIG. 7 showing the details of the operations carried out in step 250 of FIG. 3 for diagnosis of acceleration sensors, in step 251 it is judged if the wheel drive torque Td calculated in step 203 or 204 of FIG. 6 is larger than a threshold value Kd1. The value of Kd1 is determined to ensure the chances where the vehicle is being so substantially accelerated that the diagnosis of the acceleration sensors is effectively accomplished available on a general substantially horizontal road by intermittent depressions of the accelerator pedal by the driver with occasional intrusions of braking. When the answer is yes, the control proceeds to step 252, and a count C1 of a counter incorporated in the electric control 36 is incremented by 1. This is to count a time of duration of Td being larger than Kd1. Then the control proceeds to step 253.

In step 253, the absolute value of the current longitudinal acceleration difference ΔGxwf calculated in step 153 of FIG. 5 is accumulated to provide an integration value X1. Similarly, in step 254, the absolute value of the current longitudinal acceleration difference ΔGxtf calculated in step 207 of FIG. 6 is accumulated to provide an integration value X2. Then the control proceeds to step 255, and it is judged if a flag Fd1 is set to 1. In the first pass of the control to this step, the flag Fd1 is set at 0 as initialized at the start of operation of the behavior control device as is usual in this art. Therefore, in the first pass, the answer is no, then the control proceeds to step 256, and the flag Fd1 is set to 1. In the second and subsequent passes of control, the answer of step 255 is yes, and therefore step 256 is bypassed.

In step 257, it is judged if the wheel drive torque Td (n) calculated in step 203 or 204 of FIG. 6 in the present pass of control is equal to or larger than the wheel drive torque Td (n−1) calculated in step 203 or 204 in the preceding pass of control. When the answer is yes, the control proceeds to step 258, while when the answer is no, the control proceeds to step 259. In step 258, the second longitudinal acceleration difference ΔGxtf (n) calculated in step 207 of the present pass of control, the wheel drive torque Td (n) calculated in step 203 or 204 of the present pass of control, and the first longitudinal acceleration difference ΔGxwf (n) calculated in step 153 of FIG. 5 of the present pass of control are stores as values Z1, Z2 and Z3, respectively. On the other hand, in step 259, the second longitudinal acceleration difference ΔGxtf (n−1) calculated in step 207 of the preceding pass of control, the wheel drive torque Td (n−1) calculated in step 203 or 204 of the preceding pass of control and the first longitudinal acceleration difference ΔGxwf (n−1) calculated in step 153 of the preceding pass of control are stores as quantities Z1, Z2 and Z3, respectively. Then the control returns to step 50. Thus the largest values of ΔGxtf, Td and ΔGxwf in the meantime are ensured as Z1, Z2 and Z3.

When the vehicle is being continuously accelerated at such a degree as the condition of step 251 is satisfied, the control circulates through steps 251 to step 257 and then through either step 258 or 259, accumulating each current absolute value of ΔGxwf and ΔGxtf, while picking up the ever largest values of ΔGxtf, Td and ΔGxwf.

Then, when the acceleration of the vehicle ends or subsides so that the judgment of step 251 turns into no, the control proceeds to step 260, and it is judged if the flag Fd1 is 1. When the control has come to step 260 after once having passed through steps 252 through step 258 or step 259, the answer is yes, so that the control proceeds to step 261, and it is judged if the count C1 is smaller than a threshold value Kd2. This is to judge if the acceleration has not continued too long to be a good sample for judging the normal operation of the acceleration sensor, because if the acceleration continues a very long time, the contents of the acceleration will be a mixture of various non-uniform accelerating conditions and would not be suitable for the judgment of the normal operation of the acceleration sensor. Therefore, when the answer is no, the control proceeds to step 262, and a flag Fd2, the function of which will become soon clear hereinbelow, is reset to zero, and the control proceeds to step 263. In step 263, C1, X1, X2, Fd1, Z1 Z2 and Z3 are all reset to zero, and the control proceeds to step 300, assuming that the longitudinal acceleration sensor is operating normally unless judged to be not normally operating.

When the answer of step 261 is yes, the control proceeds to step 264. In step 262, it is judged if X1/C1, i.e. the mean value of ΔGxwf in the meantime, is smaller than Kd3, a threshold value predetermined for judging if the difference ΔGxwf is small enough to indicate that the acceleration sensor is operating normally. When the answer is yes, it is judged that the acceleration sensor is operating normally. In this case, the control proceeds to step 262, and the flag Fd2 is reset to zero. Therefore, Fd2=0 means that the acceleration sensor was diagnosed as operating normally. On the other hand, when the answer of step 264 is no, i.e., when the longitudinal acceleration detected by the acceleration sensor is substantially different from the longitudinal acceleration detected by the wheel rotation dependent longitudinal acceleration detection means, the control proceeds to step 265. As already noted, even when the difference ΔGxwf is not smaller than Kd3 predetermined for the diagnosis of the acceleration sensor, it is probable that the difference is due to the vehicle having been accelerated on an uphill road.

Therefore, in step 265, it is judged if X2/C1, i.e. the mean value of ΔGxtf in the meantime, is smaller than Kd4, a threshold value predetermined to be an appropriate threshold value for judging if, based upon the comparison between the output of the acceleration sensor and the output of the wheel drive torque dependent longitudinal acceleration detection means, both not affected by the vehicle climbing an uphill road, though not so sharp as the acceleration sensor being compared with the wheel rotation dependent longitudinal acceleration detection means, there is any substantial difference such as still to indicate a malfunction of the acceleration sensor. When the answer of step 265 is yes, the control proceeds to step 262, overriding the "no" judgment in step 264, resetting the flag Fd2 to zero, and assuming that the acceleration sensor is operating normally.

When the answer of step 265 is no, there is a probability that the normal operation of the acceleration sensor was lost. Then, the control proceeds to step 266, and a count C2 of a counter incorporated in the electric control 36 is incremented by 1. The count C2 is to count the times of the acceleration sensor being judged as not operating normally before starting a countermeasure of a compensation for a loss of the normal operation of the acceleration sensor. Then, the control proceeds to step 267.

In step 267, it is judged if the count C2 is larger than Kd5, a threshold value which may be appropriately determined to be, for example, 5 to 7, so that a few times diagnosis errors of the normal acceleration sensor may be disregarded, while when the longitudinal acceleration sensor or at least one of the two linear acceleration sensors in the embodiment shown in FIG. 2 has really got out of the normal operation, it is infallibly detected. Until the count C2 exceeds the threshold value Kd5, the control proceeds to step 263. When the answer of step 267 turns into yes, the control proceeds to step 268, and the flag Fd2 is set to 1, to indicate that the longitudinal acceleration sensor is not normally operating, and then the control proceeds to step 269

When the control comes to step 269, a light (not shown) for warning a failure of the normal operation of the longitudinal acceleration sensor 38 or the combination of the sensors 39 and 41, is put on, and the behavior control of the vehicle is modified to compensate for the failure of the normal operation of the acceleration sensor. As already noted, such a modification of the behavior control may include to suspend the execution of the behavior control incorporating the output of the acceleration sensor 38 or the combination of the sensors 39 and 41. Then, the control proceeds to step 300.

When the answer of step 260 is no, i.e. when the control comes to step 260 with no ever passing through steps 252-step 258 or step 259, the control proceeds to step 270, and it is judged if the flag Fd2 is zero. When the answer is yes, i.e. when the longitudinal acceleration sensor 38 or the combination of the sensors 39 and 41 is normally operating according to the former diagnosis, the control proceeds to step 300, assuming that the longitudinal acceleration sensor is still operating normally, while when the flag Fd2 is not zero, i.e. 1, the control proceeds to step 269.

Referring to FIG. 8 showing the details of the operations carried out in step 300 of FIG. 3 for calculation of load, in step 301 load L on the vehicle is calculated as L=f1(Z1/Z2)−L0, wherein f1 is a function for calculating the total mass value of the vehicle including the original mass value L0 of the vehicle and the load L carried by the vehicle according to Z1/z2 based upon Z1 and Z2 calculated in step 258 or 259 of FIG. 7, i.e. a ratio of the difference ΔGxtf between the longitudinal acceleration Gxt calculated based upon the wheel drive torque and the longitudinal acceleration Gx detected by the longitudinal acceleration sensor 38 or the combination of the linear acceleration sensors 39 and 41 at the moment when the wheel drive torque Td is maximum in the circulation of the control through steps 251-step 258 or 259. It will be appreciated that the total mass value L+L0 can be estimated based upon such a ratio Z1/Z2. The function f1 (Z1/Z2) may be determined as a map of the relationship between L+L0 and Z1/Z2.

In step 302, a modification factor Fls for compensating the spin quantity (described later with reference to FIGS. 12A and 12B) according to the load and a modification factor Fld for compensating the driftout quantity (also described later with reference to FIGS. 12A and 12B) according to the load are calculated based upon appropriate maps or the like not shown in the figure. The modification factors Fls and Fld are incorporated in steps 505 and 509 of FIG. 12A, respectively, described in detail hereinbelow. As will be appreciated in steps 505 and 509, the functions of these modification factors Fls and Fld are to modify the performance of applying a spin suppress braking or a driftout suppress braking to a respectively selected wheel or wheels according to the spin quantity indicating a liability of the vehicle to spin or the driftout quantity indicating a liability of the vehicle to driftout so that the braking is applied earlier when the load on the vehicle increases. Then the control proceeds to step 350.

Referring to FIG. 9 showing the details of the operations carried out in step 350 for calculation of tire diameter, in step 351, a tire diameter Dt is calculated Dt=f2 (Z3/Z2) based upon a ratio of Z3 to Z2, both having been calculated in step 258 or 259, wherein f2 is an appropriate function for calculating the tire diameter of the wheels based upon the ratio Z3/Z2, i.e. the ratio of the difference $\Delta$Gxwf between the longitudinal acceleration calculated based upon the wheel rotation speed and the longitudinal acceleration detected by the longitudinal acceleration sensor at the moment when the wheel drive torque Td is maximum during the control circulation through steps 251–258 or 259 of FIG. 7, i.e. when the vehicle is being substantially accelerated on a horizontal or an uphill road. It will be appreciated that the tire diameter of the wheels is a function of such a ratio Z3/Z2, or in other words, when the tires have been optionally changed by a customer to those of a different diameter from the original, the change of the tire diameter can be detected as a difference in the value of f2 (Z3/Z2). The function f2 may be prepared as a map giving the relationship between Dt and Z3/Z2.

In step 352, a factor Ft for compensating a change of the tire diameter is calculated based upon an appropriately prepared map or the like not shown in the figure. The tire diameter compensation factor Ft is incorporated in step 523 of FIG. 12B described in detail hereinbelow. The function of the factor Ft is to modify the target wheel speed for a spin suppress braking or a driftout suppress braking for a corresponding adjustment of the relationship between the wheel peripheral speed and the wheel rotation speed. Then the control proceeds to step 400.

Referring to FIG. 10 showing the details of the operations carried out in step 400 of FIG. 3 for judgment of downslope descending, in step 401, it is judged if the longitudinal acceleration difference $\Delta$Gxwf between the longitudinal acceleration Gxw calculated based upon the wheel rotation speed and the longitudinal acceleration Gx detected by the longitudinal acceleration sensor is smaller than–Ks1, wherein Ks1 is a predetermined positive threshold value for confirming that the vehicle is descending a downslope of a substantial inclination for which a modification of the behavior control is desirable. As will be noted from the above-mentioned fundamental construction of the longitudinal acceleration sensors, when the vehicle is descending a downslope with an inclination relative to the horizontal level, the inertial mass element of the longitudinal acceleration sensor shifts forward of the vehicle from its neutral position even in the absence of any longitudinal acceleration in the vehicle. Therefore, when the vehicle is descending a substantial downslope road, $\Delta$Gxwf will be smaller than –Ks1, if the value of Ks1 is determined appropriately. When the answer of step 401 is yes, the control proceeds to step 402, and it is judged if the wheel drive torque Td is equal to or smaller than 0, i.e. if the engine is idling or braking the vehicle, so as to confirm that the condition of step 401 is being met on a downslope descending. When the answer is yes, the control proceeds to step 403, and a downslope angle $\alpha$ is calculated based upon $\Delta$Gxwf and the acceleration of gravity g as $\alpha=\sin^{-1}$ (–$\Delta$Gxwf/g).

In step 404, a factor Fs for compensating the slip ratio in descending a downslope is calculated based upon a according to an appropriately prepared map or the like not shown in the figure. The factor Fs is incorporated in steps 511 and 520 of FIGS. 12A and 12B, respectively, as described in detail hereinbelow. The function of the factor Fs is to modify the target slip ratio (described later with reference to FIGS. 12A and 12B) for a spin suppress braking or a driftout suppress braking for compensating a reduction of the tire contact force against the road surface due to an inclination of the vehicle from the horizontal level. Then the control proceeds to step 450.

Referring to FIG. 11 showing the details of the operations carried out in step 450 of FIG. 3 for judgment of cant, in step 451, a lateral acceleration difference $\Delta$Gy is calculated as a difference between the lateral acceleration Gy detected by the lateral acceleration sensor 40 or the combination of the linear acceleration sensors 39 and 41 and a product of a yaw rate $\gamma$ detected by the yaw rate sensor 44 and a vehicle speed V detected by the vehicle speed sensor 42. Herein it is to be noted that this cant judgment routine is proposed based upon that the lateral acceleration sensor is provided by such a combination of the two linear acceleration sensors 39 and 41 as shown in FIG. 2, so that when it is checked that the combination of the two linear acceleration sensors operates normally as the longitudinal acceleration sensor of the vehicle, it is guaranteed that the combination of the two linear acceleration sensors also operate normally as the lateral acceleration sensor of the vehicle. On the other hand, when the lateral acceleration sensor is provided as an independent device such as 40 diagrammatically shown in FIG. 1B, there still remains a problem that the normal operation of the routine of FIG. 11 is not always guaranteed unless the lateral acceleration sensor is timely judged.

In step 452, $\Delta$Gy is filtered to $\Delta$Gyf by noises being deleted. Then in step 453, it is judged if the absolute value of $\Delta$Gyf is larger than a predetermined threshold value Kc1 which is determined to detect a cant of the road surface inclined enough to be incorporated into the behavior control.

When the answer is yes, the control proceeds to step 454, and a cant angle $\Delta$ is calculated as $\delta=\sin^{-1}$ ($\Delta$Gyf/g).

In step 455, a factor Fc for compensating the slip ratio according to the cant is calculated based upon the angle $\delta$ according to an appropriately prepared map or the like not shown in the figure. The factor Fc is incorporated in steps 511 and 520 of FIGS. 12A and 12B, respectively. The function of the factor Fc is to modify the target slip ratio for compensating a reduction of the tire grip force against the road surface due to a cant inclination of the road surface from the horizontal level. Further, the cant will increase or decrease a side force available by the functional contact of the wheel with the road surface during a turn running of the vehicle according to the relationship between the direction of canting and the direction of turning. Therefore, the factor Fc will be such a value that changes around a neutral value 1 to be smaller than 1 when the cant has an inclination of supporting a centrifugal force acting at the turning vehicle and to be larger than 1 when the cant faces away the centrifugal force acting at the turning vehicle. Then the control proceeds to step 500.

Referring to FIGS. 12A and 12B showing the details of the operations carried out in step 500 of FIG. 3 for behavior control, in step 501, a side slide acceleration Vyd of the vehicle body is calculated as Vyd=Gy−γ·V. Then in step 502, by first integrating the side slide acceleration Vyd on time basis, a side slide velocity Vy is calculated, and then by dividing the side slide velocity Vy by a longitudinal velocity Vx which may be the vehicle speed V detected by the vehicle speed sensor 42 or the reference wheel Vwref of step 101, a slip angle β of the vehicle body is calculated as β=Vy/Vx.

In step 503, taking two positive constants K1 and K2 appropriately, a value herein called spin value SV is calculated as a linear some of the slip angle β and the side slide acceleration Vyd, such as SV=K1·β+K2·Vyd. In step 504, the direction of turn of the vehicle is judged from the sign of the yaw rate γ, and a parameter herein called spin quantity SQ is determined to be equal to SV when the spin value SV is positive, and to be equal to −SV when the spin value SV is negative. Or, the spin quantity may be determined to be more sensitive about the variety of turn behavior of the vehicle such that, when the spin value SV is positive in conformity with the yaw rate γ being positive, the spin quantity SQ is equal to SV but if the spin value SV is negative against the positive yaw rate γ, the spin quantity SQ is made 0, and similarly when the spin value SV is negative in conformity with the yaw rate γ being negative, the spin quantity SQ is equal to −SV but if the spin value SV is positive against the negative yaw rate γ, the spin quantity SQ is made 0. As will be appreciated, the spin quantity SQ is a parameter which shows the liability of the vehicle to spin.

In step 505, the spin quantity SQ is modified by the load compensation spin quantity modification factor Fls calculated in step 302 of FIG. 8. It will be appreciated that the factor Fls may be determined to increase from 1.00 according to an increase of the load L calculated in step 301 of FIG. 1 over a standard load value.

In step 506, by first calculating a target yaw rate γc based upon a vehicle speed V detected by the vehicle speed sensor 42, a steering angle θ detected by the steering angle sensor 48, the wheel base of the vehicle (denoted H) and an appropriate stability factor Kh as γc=V·θ/(1+Kh·V²)·H, and by modifying the target yaw rate γc by the Laplace transformation for a first order delay with an appropriate time constant T, a standard yaw rate γt is calculated as γt=γc/(1+T·s).

In step 507, a value herein called driftout value DV is calculated based upon the standard yaw rate γt and the yaw rate γ detected by the yaw rate sensor 44 as DV=γt−γ or DV=H·(γt−γ)/V.

In step 508, a parameter herein called driftout quantity DQ is determined to be equal to DV when the vehicle is making a left turn, and to be equal to −DV when the vehicle is making a right turn. When the driftout quantity would nevertheless get negative, it is made 0. As will be appreciated, the driftout quantity DQ is a parameter which shows the liability of the vehicle to driftout.

In step 509, the driftout quantity DQ is modified by the load compensation driftout quantity modification factor Fld calculated in step 302 of FIG. 8. It will be appreciated that the factor Fld may also be determined to increase from 1.00 when the load L increases from the standard load.

Figure 13:
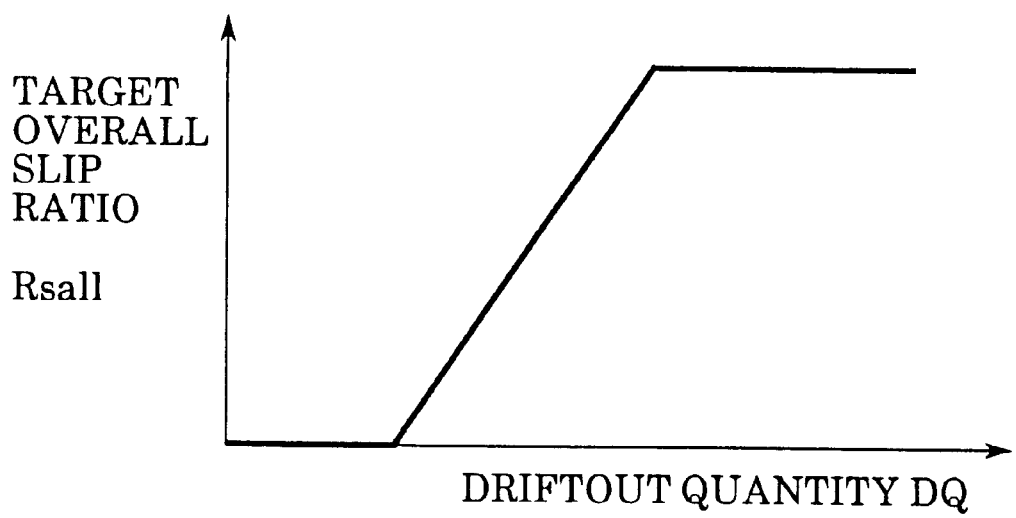
FIG. 13 is a map showing an embodiment of the performance of the target overall slip ratio Rsall against the driftout quantity DQ.

In step 510, referring to a map such as shown in FIG. 13, a target overall slip ratio Rsall is read out against the value of the driftout quantity DQ. The target overall slip ratio Rsall is a target value for the overall slip ratio to be born by the four wheels for suppressing the vehicle against drifting out by decreasing the vehicle speed. Then in step 511, the target overall slip ratio Rsall is modified by the downslope descending compensation slip ratio factor Fs and the cant compensation slip ratio factor Fc. It will be appreciated that the factor Fs may be determined to increase from 1.00 according to an increase of the downslope angle α. The factor Fc will have to be determined to increase or decrease from 1.00 according to an increase or a decrease or vice versa of the cant inclination δ according to the difference of the direction of cant inclination relative to the direction of a centrifugal side force acting at the vehicle body.

In step 512, it is judged if Rsall is 0. If the answer is no, the control proceeds to step 513, and a count value Cd (reset to 0 at the start of the control) is increased by an increment m, and the control proceeds to step 514. When the answer of step 512 is yes, the control proceeds to step 515, and the count value Cd is decreased by a decrement n, and then in step 516 it is judged if the count value Cd is smaller than 0. When the answer is yes, the control proceeds to step 517, and the count value Cd is reset to 0, while when the answer is no, the control proceeds to step 514.

Figure 14:
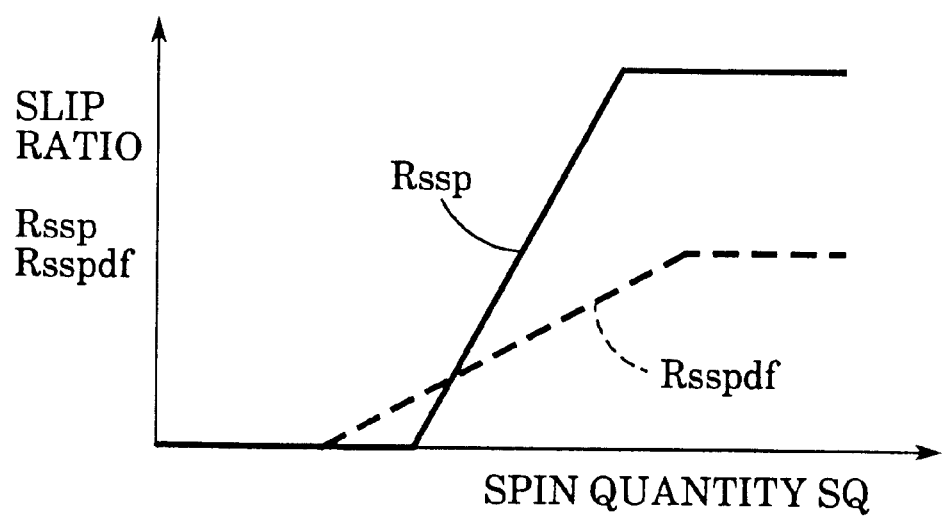
FIG. 14 is a map showing an embodiment of the performances of the slip ratios Rssp and Rsspdf against the spin quantity SQ.

In step 514, referring to a map such as shown in FIG. 14, a first slip ratio Rssp is read out against the value of the spin quantity SQ, and in step 518 a second slip ratio Rsspdf is read out against the value of the spin quantity SQ. Rssp indicates a slip ratio to be effected at a front wheel serving at the outside of a turn running of the vehicle in such a condition that only a spin suppress control will be needed, while Rsspdf indicates a slip ratio to be effected at a front wheel serving at the outside of a turn running of the vehicle in such a condition that both the spin suppress control and the driftout suppress control will be needed.

In step 519, a target slip ratio Rssfo for a front wheel serving at the outside of a turn running of the vehicle is calculated by combining Rssp and Rsspdf as Rssfo=Rssp·(Kd−Cd)/Kd+Rsspdf·Cd/Kd.

As will be appreciated, by the values of m and n being appropriately determined together with a limit value Kd, Rssfo is gradually changed over between Rssp and Rsspdf at a desired speed according to an uprise or a subside of Rsall.

In step 521, target slip ratios of four wheels Rsi (i=fl, fr, rl and rr) are calculated such that the slip ratio of a front wheel serving at the outside of a turn is Rssfo, the slip ratio of a front wheel serving at the inside of the turn is 0, and the slip ratio of each rear wheel is (Rsall−Rssfo)/2. Then in step 522, target wheel speeds of the four wheels Vwti (i=fl, fr, rl and rr) are calculated based upon the target slip ratios Rsi.

In step 523, the target wheel speeds Vwti are modified by the tire diameter compensation factor Ft, so as to adjust the wheel speed which is indeed detected or controlled by the wheel rotation speed.

Finally in step 524, a braking force control is executed to accomplish the each calculated target slip ratio at each of the four wheels.

Although the present invention has been described in detail with respect to a synthetic embodiments thereof incorporating various aspect of the invention, it will be apparent for those skilled in the art that various modifications are possible with respect to the shown embodiment within the scope of the present invention.

What is claimed is:

1. A behavior control device of a vehicle having a vehicle body, wheels supporting the vehicle body, an engine for driving the vehicle through at least a pair of drive wheels foaming a part of the body support wheels, and a brake system for selectively braking at least a part of the body support wheels, the device comprising:

means for detecting operation parameters of the vehicle, the vehicle operation parameter detection means including an acceleration sensor for detecting longitudinal acceleration of the vehicle depending upon an inertia of a movable mass element, means for detecting rotation speed of at least one of the body support wheels, means for detecting a torque for driving the drive wheels, means for detecting longitudinal acceleration of the vehicle depending upon the wheel rotation speed detected by the wheel rotation speed detection means, and means for detecting longitudinal acceleration of the vehicle dependent upon the wheel drive torque detected by the wheel drive torque detection means, means for judging the acceleration sensor as not operating normally according to the longitudinal acceleration detected by the acceleration sensor being different from the longitudinal acceleration detected by the wheel rotation dependent longitudinal acceleration detection means beyond a threshold value predetermined therefor, excepting at least when the longitudinal acceleration detected by the acceleration sensor is not different from the longitudinal acceleration detected by the wheel drive torque dependent longitudinal acceleration detection means beyond a threshold value predetermined therefor, and means for controlling the brake system based upon the operation parameter or parameters of the vehicle detected by at least one, including the acceleration sensor, of the vehicle operation parameter detection means, so as to control a running behavior of the vehicle, with a modification thereof for a compensation for a failure of a normal operation of the acceleration sensor when it is not judged as normally operating by the acceleration sensor normal operation judgment means.

2. A behavior control device according to claim 1, wherein the acceleration sensor comprises first and second linear acceleration sensor elements mounted to the vehicle body along a phantom plane disposed substantially horizontally relative to the vehicle, the first linear acceleration sensor element being substantially turned from both longitudinal and lateral directions of the vehicle, while the second linear acceleration sensor element is turned from the first linear acceleration sensor element for an angle not substantially different from a light angle, so that a longitudinal acceleration of the vehicle body is detected by comparing linear accelerations detected along the first and second linear acceleration sensor elements, while a lateral acceleration of the vehicle body is also available by comparing the linear accelerations detected along the first and second linear acceleration sensor elements.

3. A behavior control device according to claim 1, further comprising means for calculating a spin quantity indicating a liability of the vehicle to spin and a driftout quantity indicating a liability of the vehicle to driftout based upon parameters available from the vehicle operation parameter detection means, means for detecting a maximum wheel drive torque accelerating the vehicle in the period of the acceleration, means for detecting a difference between a longitudinal acceleration of the vehicle corresponding to the maximum wheel drive torque and a longitudinal acceleration detected by the acceleration sensor at a moment of the maximum wheel drive torque being generated, and means for calculating a load of the vehicle based upon a ratio of the longitudinal acceleration difference to the maximum wheel drive torque, wherein the brake system control means modify at least one of the spin quantity and the driftout quantity for a compensation for the load in controlling a braking force applied to each selected one of the wheels based upon at least one of the spin quantity and the driftout quantity.

4. A behavior control device according to claim 1, further comprising means for detecting a maximum wheel drive torque accelerating the vehicle in the period of the acceleration, means for detecting a difference between a longitudinal acceleration of the vehicle detected by the wheel rotation dependent acceleration detection means and a longitudinal acceleration detected by the acceleration sensor at a moment of the maximum wheel drive torque being generated, and means for calculating a tire diameter of the wheels based upon a ratio of the longitudinal acceleration difference to the maximum wheel chive torque, wherein the brake system control means calculate a slip ratio to be effected at each selected one of the wheels by a controlled braking applied thereto with a compensation for the tire diameter.

5. A behavior control device according to claim 1, further comprising means for detecting the vehicle descending a downslope road according to if a longitudinal acceleration of the vehicle detected by the wheel rotation dependent acceleration detection means is smaller than a longitudinal acceleration detected by the acceleration sensor by a difference larger than a threshold longitudinal acceleration difference value predetermined therefor with no positive wheel drive torque dependent acceleration of the vehicle, and means for calculating a downslope angle based upon the longitudinal acceleration difference, wherein the brake system control means modify a behavior control braking applied to each selected one of the wheels according to the downslope angle for a compensation for a reduction of a ground contact force of each of the wheels with the vehicle being on a downslope road.

6. A behavior control device according to claim 2, wherein the vehicle operation parameter detection means further include means for detecting yaw rate of the vehicle body, and means for detecting vehicle speed, the device further comprising means for calculating a cant angle of a road surface based upon a difference between a lateral acceleration of the vehicle body detected by the combination of the first and second linear acceleration sensor elements and a lateral acceleration calculated as a product of a yaw rate and a vehicle speed detected by the yaw rate detection means and the vehicle speed detection means, respectively, wherein the brake system control means modify a behavior control braking applied to each selected one of the wheels according to the cant angle for a compensation for an influence of a cant of a road surface on a behavior of the vehicle.

* * * * *